Dec. 4, 1956  R. W. BAILEY ET AL  2,772,426
DEVICE FOR INSERTING HEADED MEMBERS
IN APERTURED MEMBERS
Filed Jan. 21, 1953  3 Sheets-Sheet 1

INVENTORS
ROY W. BAILEY.
JOHN THOMAS FAULL.
EVERETT GILL.
BY
Samuel Weisman
ATTORNEY.

Dec. 4, 1956

R. W. BAILEY ET AL 2,772,426

DEVICE FOR INSERTING HEADED MEMBERS
IN APERTURED MEMBERS

Filed Jan. 21, 1953

INVENTORS.
ROY W. BAILEY.
JOHN THOMAS PAULL.
EVERETT GILL.

BY

Samuel Wiseman

ATTORNEY

United States Patent Office 2,772,426
Patented Dec. 4, 1956

2,772,426

DEVICE FOR INSERTING HEADED MEMBERS IN APERTURED MEMBERS

Roy W. Bailey, John T. Faull, and Everett Gill, Detroit, Mich., assignors to Detroit Power Screwdriver Company, Detroit, Mich., a corporation of Michigan Application January 21, 1953, Serial No. 332,363

3 Claims. (Cl. 10—155)

The present invention pertains to a novel device for assembling screws in washers.

The principal object of the invention is to provide a device of this character to which the screws and washers are delivered on separate tracks, to be assembled and then conveyed by another track to a driving machine of the general character disclosed in the patents cited below. A pressure-operated member inserts a screw into a washer alined therewith, and in this connection, another object of the invention is to adapt this member to operate escapements on the respective tracks and to release the assembled screw and washer for movement on the track sections that lead to the driver. A further object of the invention is to provide means for guiding the screw while it is being moved under pressure into the alined washer and also means for releasing the screw from the guiding means when the screw has been fully seated in the washer.

In the accomplishment of these objects, the screw and washer are delivered by separate tracks into a body on which is pivotally mounted a pair of guide fingers drawn together by a spring. The screw, which is admitted over the washer, enters a recess formed in the meeting fingers, while the washer is brought to rest by stop members on the lower ends of the fingers, in alinement with the screw. The screw is suspended in the fingers by a pair of resiliently mounted jaws extending beneath the head of the screw.

The screw head is pushed through the jaws by a pressure-actuated rod engaging the top of the screw head. In this movement the shank of the screw is guided toward the alined washer by a restricted passage formed in the lower ends of the fingers. When the head reaches this passage it spreads the fingers apart and passes out of the enlarged passage to become fully seated on the washer.

The lower ends of the fingers carry stops that hold the washer seated for assembly. When the fingers spread apart as described, the stops clear the washer and permit the assembled screw and washer to slide down a track section to the driving device.

The tracks for supplying screws and washers to the body for assembly are equipped with escapements that permit only one piece at a time to enter the body. The pressure-operated member for pushing the screw into the washer operates these escapements to permit new pieces to enter the body when an assembled screw and washer has been discharged therefrom.

The invention is fully disclosed by way of example in the following description and in the accompanying drawings in which Figure 1 is a detail perspective view of the device of the invention;

Figure 4 is a section on the line 4—4 of Figure 2;

Figure 5 is a section on the line 5—5 of Figure 4;

Figure 6 is a detail elevation on the line 6—6 of Figure 4;

Figure 8 is a section on the line 8—8 of Figure 4.

Reference to these views will now be made by use of like characters which are employed to designate corresponding parts throughout.

The device of the invention is adapted for use with a power-operated screw driving machine of the same general character as those shown in U. S. patents to Dellaree, No. 1,866,880 of July 12, 1932; No. 1,862,845 of June 14, 1932, and No. 1,813,697 of July 7, 1931. Such a machine include a spindle 2, the latter being operated by mechanism disclosed elsewhere in the art, and therefore, not requiring detailed description here. On the lower end of the spindle is a driver 3 consisting, for example, of a pair of spring fingers, adapted to drive a screw 4.

Figure 2:
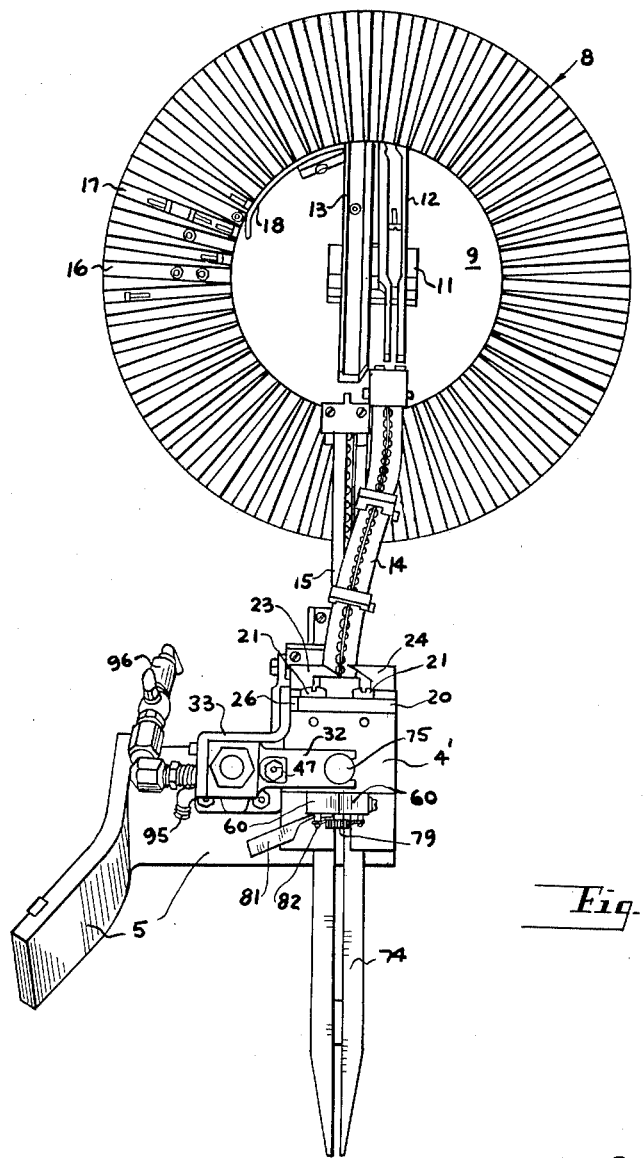
Figure 2 is a plan view.

Laterally adjacent to the driver 3 is a block or body 4 in which screws are assembled in washers as will presently be shown. The member 4 rests on a bracket 5. A grooved ring 8 rotatably surrounds the fixed bottom 9 of a hopper and is driven by a motor not shown here but disclosed in the aforementioned patents. A mounting block 11 fastened on the bottom 9 supports a pair of relatively short juxtaposed track sections 12 and 13 extending from the uppermost inner edge of the ring 8 towards the block 4' but terminating within the ring as shown more clearly in Figure 3. Matching track sections 14 and 15 are secured at different levels and extend into alinement with the sections 12 and 13 respectively although spaced therefrom for a purpose that will presently be described. The track section 14, which is higher in the block 4', is suitably bent to aline with the section 12, as shown in Figure 2.

The upper surface of the rotary ring 8 is formed with alternating and rather closely spaced flat grooves 16 and deeper, rounded grooves 17. The former are designed to retain and carry the washers flatwise, while the grooves 17 pick up and carry the screws lengthwise, as shown in Figure 2, it being understood that a mass of washers and screws is contained in the hopper while the ring 8 rotates through this mass. If the ring 8 turns clockwise in Figure 2, a guard 18 extends counterclockwise from the section 13 along the lower ends of a number of slots, so that parts will not slide out of the slots before reaching the track sections 12 and 13.

Screws are inserted individually in washers within the block 4' after being released individually through escapement mechanisms before leaving the track sections 14 and 15 to enter the block. The escapement for the screws is held on the back of the block 4' by a pair of screws 21 received in horizontal slots 22 in the plate. To the lower edge of the slide plate 20 is fastened a pair of pointed claws 23 and 24 directed from opposite sides toward the line of screws in the track section 14, with the points of the respective claws spaced apart the diameter of a screw head along the line of screws. A spring 25 in one of the slots 22 bears against the corresponding screw 21 in the direction that moves the claw 24 into the line of screws, or to the left in Figure 3. To oppose the action of the spring, the upper corner of the slide 20 is beveled at 26, as shown in Figure 6, over the claw 23. The bevel 26 is engaged by a member under pressure to actuate the slide 20 against the spring 25, as will now be described.

An air cylinder 30 is mounted on a side of the block 4' and has a piston rod 31 projecting through its upper end as shown in Figure 5. On the piston rod is secured an arm 32 to which is attached an angular and downwardly projecting finger 33 positioned to engage the bevel 26 for the action described, to move the claw 23 into the line of screws. The line of screws is thus held back while an assembly operation takes place in the block 4'. When the finger 33 is withdrawn, the spring 25 projects the claw 24 behind the first screw in the line, permitting this screw to pass into the block 4' and holding back the remainder of the line.

The escapement for the washers comprises two flat springs 41, 42 having their free ends extending across the track section 15 for engagement with the line of washers as shown in Figure 4. For this purpose the spring 41 has a downturned prong 41' and the spring 42 has a downturned prong 42'. If the spring 42 alone is raised, the line of washers will advance to the prong of 41' to the extent of one washer. On the reverse movement the prong 41' will pass one washer while the prong 42' holds back the rest of the line.

This movement is accomplished by a cam having a flat portion adapted to engage both springs when they are down. The cam is mounted on a shaft fixed to a lever extending toward the cylinder 30. From the cylinder-actuated arm 32 is suspended a rod 47 (Figure 5) having a reduced portion 49 which receives the forked free end 50 of the aforesaid lever. On reciprocation of the piston rod 31, the cam is oscillated to lift the springs 41 and 42 alternately for the action described.

Figure 3:
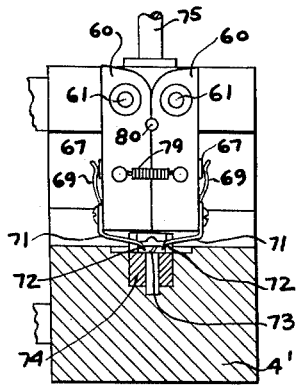
Figure 3 is a section on the line 3—3 of Figure 4.

On the forward face of the block 4' is mounted a pair of guide fingers 60 pivotally suspended from pins 61 as shown in Figures 3 and 4 while one of the fingers is shown in elevation at the parting plane in Figure 4. The lower ends of the guide fingers are enlarged at 63 to extend into an undercut 64 in the forward face of the block. At the parting plane of the ends 63 is formed a cavity 65 into which it slides in suspended position from the track 14 through a somewhat similar cavity 66 in the block 4' as shown in Figure 4. The screw comes to rest by contact with the guide fingers on the foremost wall of the cavity 65.

Opposed jaws 67 are slidably mounted in the end portions 63 of fingers 60 and form a seat below the head of the screw 68 which has traveled to the cavity 65. These jaws are held inward by leaf springs 69 fastened on the sides of the fingers 60.

The released washer passes through a guide slot 70 (Figure 4) in block 1 to a position below the cavity 65. Since this position is below the guide fingers 60, a means is provided to hold the washer. This means is merely a pair of fingers 71 fastened to the sides of the fingers 60, extending across the lower ends of the latter fingers and formed with downturned lips 72 that stop the released washer 73 as shown in Figure 4.

In this position the released washer seats on a guide member such as a piece of track 74 inserted in the block 4' and extending to the driving fingers 3 to deliver the assembled screw and washer thereto as also shown in Figure 4. The assembly operation will now be described.

A plunger or pusher rod 75 suspended from the arm 32 passes between the upper ends of the guide fingers 60 to the head of the screw 68. As the plunger is pushed down on the screwhead, the latter is forced between the spring backed jaws 67 to meet a reduced seat 76 in the lower ends of the fingers 60. A small fork 77 extends from the slot 70 over the seated washer 73 to prevent it from unseating, and the head of the screw 68 necessarily passes through the fork on its final movement.

On continued movement from the jaws 67, the head of the screw 68 comes to rest on a reduced seat 78 or restricted guide passage between the lower ends of the guide fingers 60. The guide fingers are held against each other by a connecting spring 79, and the screw head is pushed through the restricted passage against the action of the spring. The walls of the passage 78, however, remain in contact with the shank of the screw 68, before being engaged by its head, and the screw is thereby guided and directed into the seated washer 73. When the head of the screw 68 comes out of the passage 78, the fingers 60 come together again, and the assembled screw and washer slide down the track 74 as already set forth.

A pin 80 (Figures 1 and 4) projects from the body between the guide fingers 60 to center them. A cam plate 81 (Figure 3) is mounted on one of the anchoring pins 82 of the spring 79 to spread the fingers 60 manually if a piece becomes jammed between the fingers. The pin 80 fixed in the body 4' prevents the fingers 60 from moving toward either side of the closed or centered position shown in Figure 3 as a result of any irregularity in the action of the spring 79. Similarly, the lips 67' (Figure 5) on the outer ends of the jaws 67 are limited in their inward movement by their engagement with the sides of the lower ends 63 of fingers 60. Thus, an uncentered position of the seat formed by the jaws 67, through inequality of the springs 69 is avoided. An uncentered position of this seat or the seat formed by the ends 63 would misaline the screw with respect to the washer there beneath, resulting in jamming or damage of the machine, and this condition is prevented by the means described.

Figure 1:
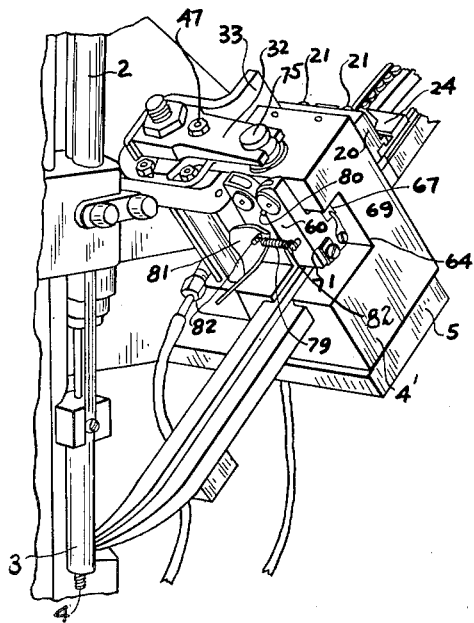
Figure 7:
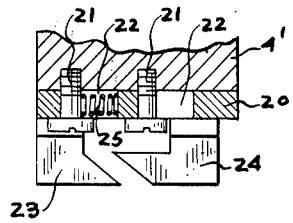
Figure 7 is a section on the line 7—7 of Figure 6.

As shown in Figure 1, the fingers 60 are mounted on an external surface of the body 4'. If improper closing of the fingers 60 or jaws 67 should be obstructed by dirt, chips, distorted screws or the like, the fingers may be spread apart by merely inserting a screwdriver between them without the need of dismantling any part of the mechanism.

For operating the cylinder 30, the latter is provided with a fitting 95 at its lower end and a fitting 96 at its upper end for connection to an air hose through suitable lines and a multiple valve to move piston rod 31 upwardly and downwardly in well known manner.

Although a specific embodiment of the invention has been illustrated and described, it will be understood that various alterations in the details of construction will be made without departing from the scope of the invention as indicated by the appended claims.

What we claim is:

1. A device for inserting headed members in apertured members comprising a body, a pair of resiliently contacting fingers pivotally suspended from said body, a pair of spring-backed opposed jaws in said fingers slightly below the upper ends thereof and forming a first seat for suspending a headed member by its head and adapted to release said head without spreading said fingers, a second seat for an apertured member in said body below said fingers, means for pushing a headed member through said seat into an apertured member, another seat formed by the lower ends of said fingers for a head and adapted to be opened by the spreading of said fingers under pressure on said head, a fixed pin projecting from said body portion between said fingers and engageable by the fingers to limit their inward movement, a guide member adapted to receive a headed member on being pushed through the last named seat, said pin being centered with reference to the path of said guide member and lips on the outer ends of said jaws and engaging the outer surfaces of said fingers to limit the inward movement of the jaws.

2. A device as set forth in claim 1, said fingers having a parallel-wall passage beneath the last named seat and forming a guide for a shank of a headed member moving toward the second seat.

3. A device as set forth in claim 1, said fingers having a parallel-wall passage beneath the last named seat and forming a guide for the shank of a headed member moving toward the second seat, a guide member in said body adapted to receive the shank of a headed member on being pushed through the last named seat.

References Cited in the file of this patent

UNITED STATES PATENTS

| | | |
|---|---|---|
| 432,477 | Casey | July 15, 1890 |
| 912,250 | Messinger | Feb. 9, 1909 |
| 1,218,746 | Coombs | Mar. 13, 1917 |
| 2,252,437 | McLaughlin | Aug. 12, 1941 |
| 2,321,548 | Hanneman | June 8, 1943 |
| 2,544,165 | Krasnow | Mar. 6, 1951 |
| 2,613,374 | Gora | Oct. 14, 1952 |